United States Patent
Takeuchi et al.

(10) Patent No.: US 7,315,543 B2
(45) Date of Patent: Jan. 1, 2008

(54) APPARATUS AND METHOD FOR DATA COMMUNICATION ON PACKET-SWITCHING NETWORK

(75) Inventors: Keisuke Takeuchi, Kunitachi (JP); Hidenori Inouchi, Higashimurayama (JP); Yukiko Takeda, Tokorozawa (JP); Katsunori Takahashi, Yokohama (JP)

(73) Assignee: Hitachi Communications Technologies, Ltd., Tokyo (JP)

( * ) Notice: Subject to any disclaimer, the term of this patent is extended or adjusted under 35 U.S.C. 154(b) by 909 days.

(21) Appl. No.: 10/758,211

(22) Filed: Jan. 16, 2004

(65) Prior Publication Data

US 2004/0233916 A1 Nov. 25, 2004

(30) Foreign Application Priority Data

May 19, 2003 (JP) ............................. 2003-140386

(51) Int. Cl.
*H04L 12/56* (2006.01)
(52) U.S. Cl. ...................... 370/392; 370/401; 370/466; 370/474
(58) Field of Classification Search ...................... None
See application file for complete search history.

(56) References Cited

U.S. PATENT DOCUMENTS 6,118,784 A * 9/2000 Tsuchiya et al. ............ 370/401
6,493,765 B1 * 12/2002 Cunningham et al. ...... 709/245
7,085,270 B2 * 8/2006 Inouchi et al. .............. 370/392
2004/0001509 A1 * 1/2004 Zhang et al. ................ 370/466

FOREIGN PATENT DOCUMENTS

| JP | 2003-87336 | 3/2003 |
| JP | 2003-174466 | 6/2003 |

OTHER PUBLICATIONS

RFC 2765.
RFC 2766.
RFC 3089.
RFC 3142.

* cited by examiner

*Primary Examiner*—Wing Chan
*Assistant Examiner*—Brian Roberts
(74) *Attorney, Agent, or Firm*—Mattingly, Stanger, Malur & Brundidge, P.C.

(57) ABSTRACT

Disclosed is a packet-switched communication apparatus (DNS proxy server) receiving and forwarding messages which are used to obtain an address corresponding to a domain name assigned to a device connected to a network from the domain name and to obtain such a domain name from the address. The communication apparatus comprises mapping retaining means for retaining mappings between network-dependent parts of addresses which are used in a first network and address translators; address translator selecting means for selecting an address translators, based on an address included in a received packet; address obtaining means for obtaining a substitutive address to replace the address included in the received packet from the selected address translator; and address replacement means for replacing the address included in the received packet by using the obtained substitutive address.

20 Claims, 11 Drawing Sheets

| IPv6 Prefix | | IPv4/IPv6 Translator | |
|---|---|---|---|
| Value | Length | IPv6 Address | Port |
| 3ffe:6700:103f:1:: | 64 | 2002::1 | 55000 |
| 3ffe:1:: | 96 | 2001:1::1 | 55000 |
| 3ffe:2:: | 96 | 2001:1::2 | 55000 |
| ⋮ | ⋮ | ⋮ | ⋮ |

| Source IPv6 Address | Message ID |
|---|---|
| 2001::1 | 1000 |
| 2001::2 | 1001 |
| 2001::3 | 1002 |
| 2001::4 | 1003 |
| ⋮ | ⋮ |

FIG. 13

| IPv6 Prefix — 170 | | Network ID — 172 |
|---|---|---|
| Value — 171 | Length | |
| 3ffe:1:: | 96 | 0 |
| 3ffe:2:: | 96 | 1 |
| 3ffe:3:: — 173 | 96 — 174 | 1 |
| ⋮ | ⋮ | ⋮ |

FIG. 14

| Network ID — 181 | IPv4/IPv6 Translator — 182 | |
|---|---|---|
| | IPv6 Address | Port |
| 0 | 2001:1::1 | 55000 |
| 1 | 2001:1::2 | 55000 |
| 1 | 2001:1::3 — 183 | 55000 — 184 |
| ⋮ | ⋮ | ⋮ |

APPARATUS AND METHOD FOR DATA COMMUNICATION ON PACKET-SWITCHING NETWORK

FIELD OF THE INVENTION

The present invention relates to packet-switched communication. More particularly, the invention relates to a packet-switched communication apparatus (DNS proxy server) receiving and forwarding messages which are used to obtain an address corresponding to a domain name assigned to a device connected to a network from the domain name and to obtain such a domain name from the address.

BACKGROUND OF THE INVENTION

Protocol translation is one technique to realize communication between two terminals under circumstances where a network to which one terminal is attached and another network to which the other terminal is attached run on different communication protocols.

For instance, concerning the Internet Protocol (IP) for use on the Internet, the Internet Protocol version 4 (IPv4) is now in common use throughout the world, but there is a concern about depletion of available addresses. To solve this problem, the Internet Protocol version 6 (IPv6) has been proposed and has reached the stage of its implementation. However, for all existing systems on the Internet, concurrent transition from IPv4 to IPv6 is practically impossible. Accordingly, methods of IP packet protocol translation for interconnecting a node on a network using IPv4 and a node on a network using IPv6 and enabling communication across these networks have been proposed. As concrete examples of these conversion methods, the following are known: "NAT-PT" described in Request For Comments (RFC) 2765 and RFC 2766 published by the Internet Engineering Task Force (IETF); "SOCKS64" described in RFC3089; "transport relay" described in RFC3142; and so forth.

In any of these techniques, IPv4/IPv6 address translation rules for mutual translation between IPv4 addresses and IPv6 addresses must have been created and held beforehand. This translation rules may be set statically in advance or may be created dynamically each time a communication path established. In the latter case, a name resolution technique in the Domain Name System (DNS) is used to trigger generation of a translation rule.

The DNS is a system to search out attributes (resource record) associated with a fully qualified domain name (FQDN), which is assigned to each device connected to a network and uniquely defined all over the world. Generally, the DNS is used to obtain an IP address from a domain name. This process of obtaining an IP address from a domain name is called name resolution. Nowadays, most applications taking advantage of the Internet obtain the IP address of a corresponding node to which to communicate with, using the DNS.

When IPv4/IPv6 translation is required, this DNS is used and a DNS message which must be transmitted to initiate communication is always monitored, and an IP address translation rule is created, triggered by a name resolution request message. Moreover, the IP address in a name resolution response message is replaced by an IP address determined, according to the created address translation rule, and the name resolution response message is sent back to the requester. To provide these functions, a DNS proxy server linked with an IPv4/IPv6 translator is employed between terminals (clients) which may send a name resolution request and a DNS server to which a query is sent.

A practical example of this operation for a scenario where communication is initiated from an IPv6 client to an IPv6 client will be discussed below.

First, the IPv6 client which is an originating terminal sends a query about the IPv6 address of the receiving terminal (client) to the DNS proxy server for name resolution. Upon having received this query, the DNS proxy server forwards this query to another DNS server and receives notification of the address of the receiving terminal (client) from the DNS server in the response to the query. Here, if the notified address is an IPv4 address, the DNS proxy server replaces the IPv4 address in the response message by a temporary IPv6 address and returns this IPv6 address to the IPv6 client. At this time, the DNS proxy server requests the IPv4/IPv6 translator to create an address translation rule that maps the IPv4 address before being replaced to the temporary IPv6 that replaces the IPv4 address. The created address translation rule is held in a table (address translation table) in the IPv4/IPv6 translator.

The originating IPv6 client transmits an IPv6 packet to the temporary IPv6 address of the receiving terminal, which was notified as the result of the name resolution. The source address of this IPv6 packet is the IPv6 address of the originating client. The IPv4/IPv6 translator receives this IPv6 packet, refers to the address translation table and searches for the IPv4 address associated with the destination IPv6 address of the IPv6 packet. Because the mapping between the IPv4 address and the temporary IPv6 address created at the time of the name resolution is held in the address translation table, the IPv4 address of the receiving terminal (client) can be obtained.

Then, the IPv4/IPv6 translator refers to the address translation table and searches for the IPv4 address corresponding to the source IPv6 address of the IPv6 packet. However, an address translation rule for the source address has not yet been created at this point of time and, therefore, the target IPv4 address cannot be obtained. The IPv4/IPv6 translator newly assigns the originating client terminal a temporary IPv4 address mapped to its IPv6 address and registers this address translation rule into the address translation table. Then, the source and destination IPv4 addresses are obtained. The IPv6 packet is translated into an IPv4 packet having the source and destination IPv4 addresses which replaced the corresponding IPv6 addresses and the IPv4 packet is transmitted to the receiving destination.

Subsequent packets to be transmitted between both clients (terminals) are translated-between IPv6 and IPv4, according to the address translation rules, as both source and destination address translation rules have been registered into the address translation table. Because the address translation rules dynamically generated for a communication are temporary, they are discarded upon the elapse of a predetermined time after the termination of the communication.

While the communication initiated from the IPv6 client to the IPv4 client has been discussed in the foregoing example, address translation rules are generated and communication is performed by way of address translation in the same procedure as described above for other situations where the IPv4 client initiates communication to the IPv6 client, where communication is performed between IPv4 clients, but requiring address translation (for example, communication across two IPv4 private networks where duplicated addresses may exist), where communication is performed, using communication protocols other than IP, and so on (for example, refer to Japanese Patent Document Cited 1).

For mapping between an IPv4 address and an IPv6 address, using the above-mentioned DNS, the IP address included in a name resolution response message must be replaced by another one. This IP address is included in a payload following an IP header, not in the IP header.

In the DNS, in reverse to obtaining an IP address by specifying the domain name of a corresponding node to which to communicate with, a process called "reverse lookup" is also be performed, in which, by specifying an IP address, the domain name of the corresponding node assigned the IP address is obtained. This reverse lookup is mainly used for e-mail, server-to-client communication, and the like.

Particularly, in a network topology where an IPv4 network and an IPv6 network are interconnected by protocol translation means, e-mail is a practically essential service. As transition to IPv6 is in progress in access networks, a further increase in demand for connecting, for example, an IPv6 client on a user terminal to an existing server on an IPv4 network is expected in future. Accordingly, in order to implement these services, it is essential to perform a reverse lookup through the DNS to look up of an IPv4 address from the IPv6 network side and to lookup of an IPv6 address from the IPv4 network side.

In the communication environment requiring IP address translation, a client terminal communicates with a corresponding client terminal, regarding a temporary IP address assigned to the corresponding client by the address translator as the IP address of the corresponding client. Accordingly, when the client terminal sends a reverse lookup query, the client would specify the temporary IP address of the corresponding client and make the query about its domain name. On the other hand, a DNS server holds a mapping between the actual IP address of a client terminal and its domain name. In order to properly obtain the domain name of the corresponding client, a query about the actual IP address of the client terminal must be sent to the DNS server. Thus, to perform a reverse lookup through the DNS in a network topology involving an IPv4 network and an IPv6 network, the temporary address of the corresponding client specified for query from the client terminal that is a reverse lookup requester must be translated into its actual address to be recognized by the DNS server.

In a packet for a reverse lookup through the DNS, specifically, an FQDN for reverse lookup corresponding to an IPv4 address or IPv6 address which serves as a query key is stored in the payload portion of the packet, following the IP header. Accordingly, the FQDN for reverse lookup in the payload portion must be translated for IP address translation. For address translation in such a packet including an IP address in the payload portion, translation in both the IP header and the payload can be performed simultaneously by a protocol translation means with support for an application level gateway (ALG), such as SOCKS64. However, because all translation process is performed by application software, high-speed protocol translation is hard to execute.

Meanwhile, protocol translation by NAT-PT involves only IP header change and the translation function is performed by dedicated hardware, and, therefore, high-speed translation can be executed. For ordinary inter-protocol communication, in most cases, translation processing is required only in the IP header and translation is not necessary in the payload. In view hereof, the NAT-PT is advantageous in terms of a total processing speed. However, if translation is necessary in the payload, an ALG must be provided separately and the packet must be transferred to the ALG for further translation after translation in the IP header is completed by an IPv4/IPv6 translator.

When, in addition to the NAT-PT, one or more ALGs for translation in the payload, such as DNS proxy servers, are used, it is a problem where address translation rules are maintained. In view of processing speed, it is considered the best that an IPv4/IPv6 translator which most frequently refers to the address translation rules maintains these rules. In such cases, the one or more ALGs query the IPv4/IPv6 translator about a substitutive address when executing address translation in the payload.

[Non-Patent Document Cited 1]
E. Nordmark, "RFC2765," "online," February, 2000, Internet <URL: http://www.ietf.org/rfc/rfc2765.txt>

[Non-Patent Document Cited 2]
H. Kitamura, "RFC3089," "online," April, 2001, Internet <URL: http://www.ietf.org/rfc/rfc3089.txt>

[Non-Patent Document Cited 3]
J. Hagino, et al., "RFC3142," "online," July, 2001, Internet <URL: http://www.ietf.org/rfc/rfc3142.txt>

[Japanese Patent Document Cited 1]
JP-A No. 156710/2000

If an IPv4 network and an IPv6 network which are of a large scale are interconnected, parallel use of a plurality of IPv4/IPv6 translators at one connection point is conceivable for load balancing and fail-free operation. In network topology variety, IPv4 private networks using private address allocation defined in RFC1918 are supposed to connect to an IPv6 network, where datagram is transferred from the IPv4 networks to the IPv6 network and vice versa and datagram transferred between different IPv4 networks, taking advantage of combination of IPv4 to IPv6 translation and IPv6 to IPv4 translation.

However, conventional ALGs to make translation in the payload were unable to determine which one of multiple IPv4/IPv6 translators to which to send a request.

SUMMARY OF THE INVENTION

The present invention, which has been made in view of the above-described problem of prior art, provides a network topology with a packet-switched communication apparatus (DNS proxy server) including means for retaining mappings between IPv6 address prefix values, each denoting a network, and IPv4/IPv6 translators, each of which uses a specific prefix. The packet-switched communication apparatus is configured to, when translation of IP address data in the payload portion of an IP packet of name resolution request is required, refer to an address included in the packet, select an IPv4/IPv6 translator mapped to the prefix value of the address, and send a request for a substitutive IP address to the IPv4/IPv6 translator.

To make translation in the payload portion of a reverse DNS lookup packet, the communication apparatus judges either a reverse lookup on an IPv4 address or a reverse lookup on an IPv6 address, contained in the packet before the translation, judges either a query or a response packet, refers to an IPv6 address located in a different portion of the packet, according to the judgment, and selects an IPv4/IPv6 translator.

The communication apparatus of the present invention may map a plurality of IPv4/IPv6 translators to one IPv6 address prefix.

According to the packet-switched communication apparatus (DNS proxy server) of the present invention, in a network system where IPv4 networks and an IPv6 network are interconnected via a plurality of IPv4/IPv6 translators, it is possible to obtain a substitutive address for translation in the payload from an appropriate IPv4/IPv6 translator and to make IP address translation to a higher-layer IP address and vice versa. It is also possible to map a plurality of IPv4/IPv6 translators to one IPv6 address prefix. Each time a request for address data is to be sent to one of the IPv4/IPv6 translators mapped to the prefix, the IPv4/IPv6 translator to which the request is sent can be switched from one to another so that load balancing across the IPv4/IPv6 translators becomes feasible.

In the network system of the present invention, a reverse DNS lookup can be performed to look up of an IPv4 address from the IPv6 network side and to look up of an IPv6 address from the IPv4 network side. Even in a mixed IPv4 network and IPv6 network topology, services such as e-mail and client-server system can be implemented as is the case in a conventional topology consisting entirely of IPv4 networks.

If a substitutive address cannot be obtained from an IPv4/IPv6 translator to which a request for such address was sent, the request for the substitutive address is re-transmitted to another IPv4/IPv6 translator mapped to the same prefix. Accordingly, trouble due to a translator fault or the like can be avoided.

BRIEF DESCRIPTION OF THE DRAWINGS

FIG. 13 shows exemplary contents of a prefix-network ID reference table relevant to the second embodiment;

FIG. 14 shows exemplary contents of a network ID-translator reference table;

DETAILED DESCRIPTION OF THE PREFERRED EMBODIMENTS

Preferred embodiments of the present invention will be described hereinafter with reference to the accompanying drawings.

A first embodiment of the present invention is first discussed.

Figure 1:
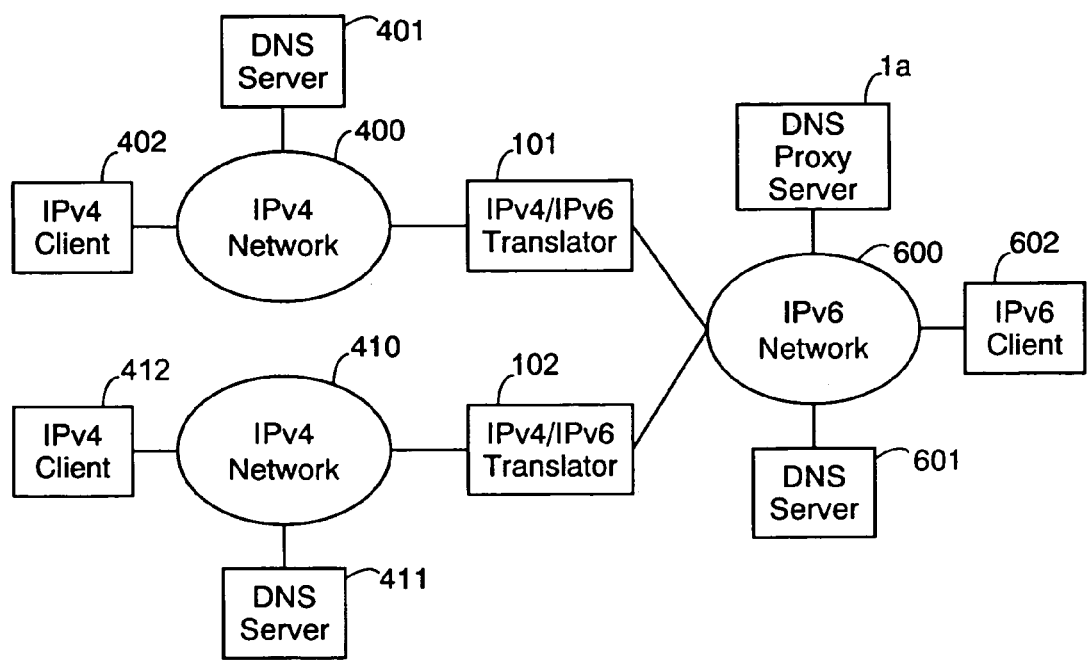
FIG. 1 is a diagram depicting the topology of a communications network system including a DNS proxy server in accordance with A first embodiment of the present invention.

FIG. 1 is a diagram depicting the topology of a communications network system including a DNS proxy server in accordance with the first embodiment of the present invention.

An IPv6 network 600 is connected to an IPv4 network 400 via an IPv4/IPv6 translator 101 and also connected to an IPv4 network 410 via an IPv4/IPv6 translator 102.

The IPv6 network 600 uses only the IPv6 communication protocol and a DNS proxy server 1a, a DNS server 601, and an IPv6 client 602 are connected thereto. The DNS proxy server 1a receives a name resolution request on behalf of the DNS server 601, determines which IPv4/IPv6 translator serves a device whose IP address is sought by the name resolution request (that is, to find that the device is attached to which network connected to which IPv4/IPv6 translator), and translates the FQDN specified in the payload of the name resolution request packet. The DNS server 601 has a table of address/name mapping for devices connected to the IPv6 network 600. The IPv6 client 602 is a computer as a data communication terminal.

The IPv4 network 400 uses only the IPv4 communication protocol and a DNS server 401 and an IPv4 client 402 are connected thereto. The DNS server 401 has a table of address/name mapping for devices connected to the IPv4 network 400. The IPv4 client 402 is a computer as a data communication terminal.

The IPv4 network 410 also uses only the IPv4 communication protocol and a DNS server 411 and an IPv4 client 412 are connected thereto. The DNS server 411 has a table of address/name mapping for devices connected to the IPv4 network 410. The IPv4 client 412 is a computer as a data communication terminal.

Because the IPv6 network 600 uses only the IPv6 communication protocol, it is only possible to specify an IPv6 address in a reverse lookup query. On the other hand, because both the IPv4 network 400 and the IPv4 network 410 use only the IPv4 communication protocol, it is only possible to specify an IPv4 address in a reverse lookup query.

The IPv4/IPv6 translators 101 and 102 are devices for translating IPv4 to IPv6 addressing and vice versa for the destination and source addresses of an IP packet transferred thereto across the network to which each is connected.

Figure 2:
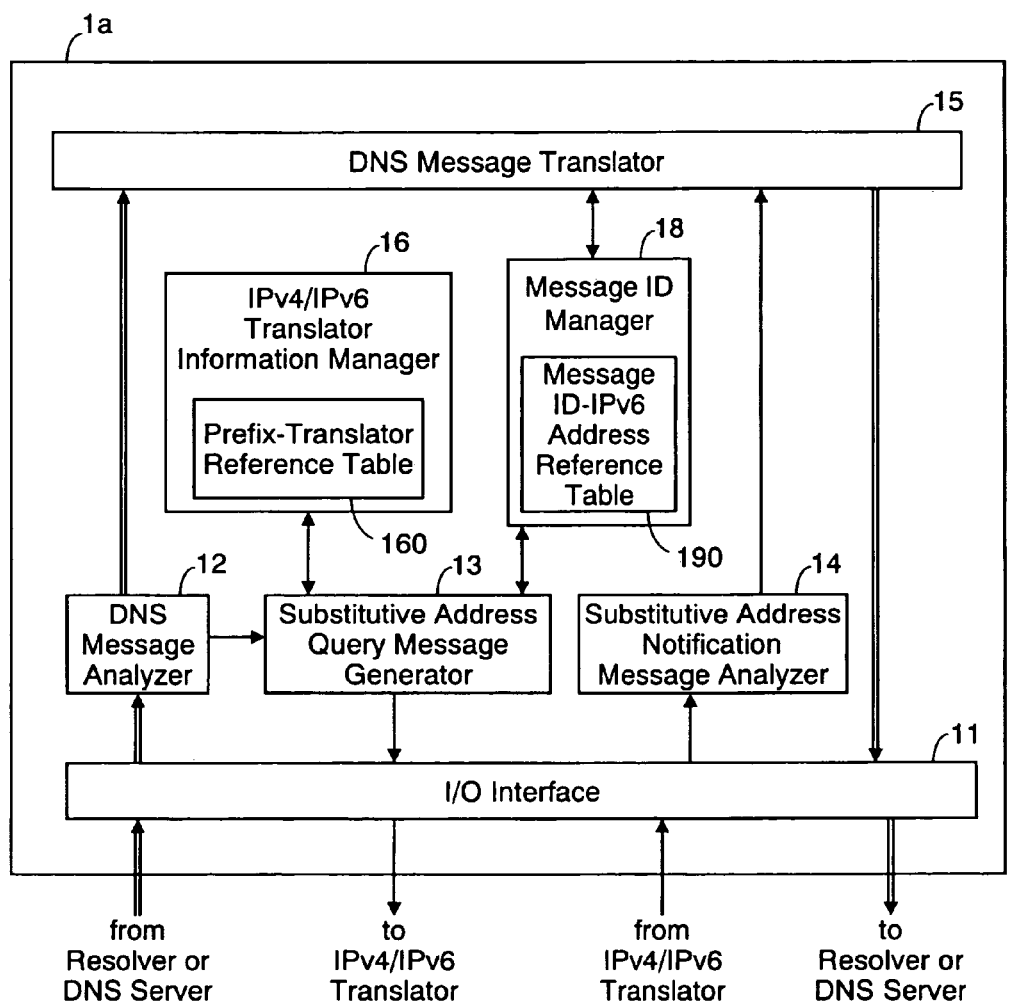
FIG. 2 is a block diagram showing the configuration of the DNS proxy server of the first embodiment.

FIG. 2 is a block diagram showing the configuration of the DNS proxy server 1a according to the first embodiment.

The DNS proxy server 1a is comprised of an I/O interface 11, a DNS message analyzer 12, a substitutive address query message generator 13, a substitutive address notification message analyzer 14, a DNS message translator 15, an IPv4/IPv6 translator information manager 16, and a message ID manager 18. These components are embodied in electronic devices, for example, CPU, RAM, etc. The I/O interface 11 transmits and receives an IP packet to be passed across the IPv4 networks and the IPv6 network.

The DNS message analyzer 12 analyzes a received message, determines the type of the message such as a reverse lookup query, a response, etc., and extracts address information, for example, an IPv4 or IPv6 address specified in a reverse lookup query, according to the type of the message.

The substitutive address query message generator 13 generates a query message to an IPv4/IPv6 translator about an address for IPv4/IPv6 translation from the address information extracted by the DNS message analyzer 12.

The substitutive address notification message analyzer 14 receives a response message to a message generated by the substitutive address query message generator 13 and analyzes the message content.

The DNS message translator 15 replaces an IPv4 address or IPv6 address specified in a reverse lookup query or response message by a substitutive address notified from an IPv4/IPv6 address translator.

The IPv4/IPv6 translator information manager 16 holds a prefix-translator reference table 160 in which mappings between IPv6 address prefix values and IPv4/IPv6 translators are defined.

The message ID manager 18 holds a message ID-IPv6 address reference table 190 in which mappings between IPv4 message IDs and source IPv6 addresses are defined.

Figures 3, 4, 5:
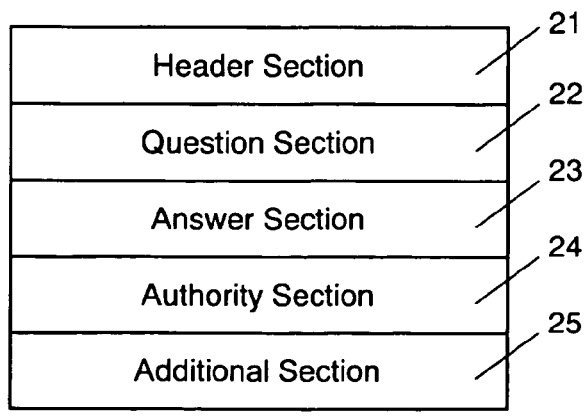
FIG. 3 shows exemplary contents of a prefix-translator reference table relevant to the first embodiment.
FIG. 4 shows exemplary contents of a message ID-IPv6 address reference table relevant to the first embodiment.
FIG. 5 shows the format of a DNS message.

FIG. 3 shows exemplary contents of the prefix-translator reference table 160 held by the IPv4/IPv6 translator information manager 16.

This prefix-translator reference table 160 consists of a column 161 for prefix entry and a column 162 for IPv4/IPv6 translator information entry. The prefix entry column 161 consists of a field 163 in which a 128-bit IPv6 address value is registered and a field 164 in which the length in bits of the prefix part of the IPv6 address, from the beginning, is registered. The IPv4/IPv6 translator information column 162 consists of a field 165 in which the IPv6 address of an IPv4/IPv6 translator is registered and a field 166 in which the User Datagram Protocol (UDP) port number of the IPv4/IPv6 translator is registered.

FIG. 4 shows exemplary contents of the message ID-IPv6 address reference table 190 held by the message ID manager 18.

This message ID-IPv6 address reference table 190 consists of a column 191 for IPv6 address entry and a column 192 for message ID entry.

Then, a reverse lookup through the DNS in the communications network system including the DNS proxy server of the first embodiment is discussed.

The reverse lookup through the DNS is implemented as follows. An IP address on which a reverse lookup is to be performed is converted to a name (FQDN) for reverse lookup and a query is made to a DNS server about the name (PTR (PoinTeR) record) corresponding to the FQDN.

If a reverse lookup on an IPv4 address is performed, an FQDN appended with "in-addr.arpa" is used for reverse lookup. This FQDN for reverse lookup is obtained by dividing a 32-bit IPv4 address into four 8-bit portions, converting all the 8-bit values into decimal values, reversing the order of the four decimal values, wherein each value is separated with a dot, and appending "in-addr.arpa" to the number part. If, for example, IPv4 address "192.168.1.142" is resolved to a domain name, an FQDN for reverse lookup "142.1.168.192.in-addr.arpa" is generated.

If a reverse lookup on an IPv6 address is performed, an FQDN appended with "ip6.arpa" is used for reverse lookup. This FQDN for reverse lookup is obtained by converting a 128-bit IPv6 address into hexadecimal values, reversing the order of the hexadecimal values, wherein each value is separated with a dot, and appending "ip6.arpa" to the number part. For example, IPv6 address "2001:1001::200:e2ff:fe53:986b" is resolved to an FQDN for reverse lookup "b.6.8.9.3.5.e.f.f.f.2.e.0.0.2.0.0.0.0.0.0.0.0.0.1.0.0.1.1.0.0.2.ip6.arpa".

By general convention, the FQDN for reverse lookup of IPv6 is formulated as "¥[x20011001000000000200e2fffe53986b/128¥].ip6.arpa" (where "¥" is often used in Japanese conventional typing, instead of a backslash symbol which would be applied more commonly in other countries).

In some system implementation, an IPv6 address may be resolved to an FQDN appended with "in6.int" instead of "ip6.arpa" for reverse lookup.

Next, details on the above-mentioned DNS message are discussed.

As is shown in FIG. 5, a DNS message is composed of a header section 21, a question section 22, an answer section 23, an authority section 24, and an additional section 25. The sections other than the header section 21 may not always exist as a complete set.

Figure 6:
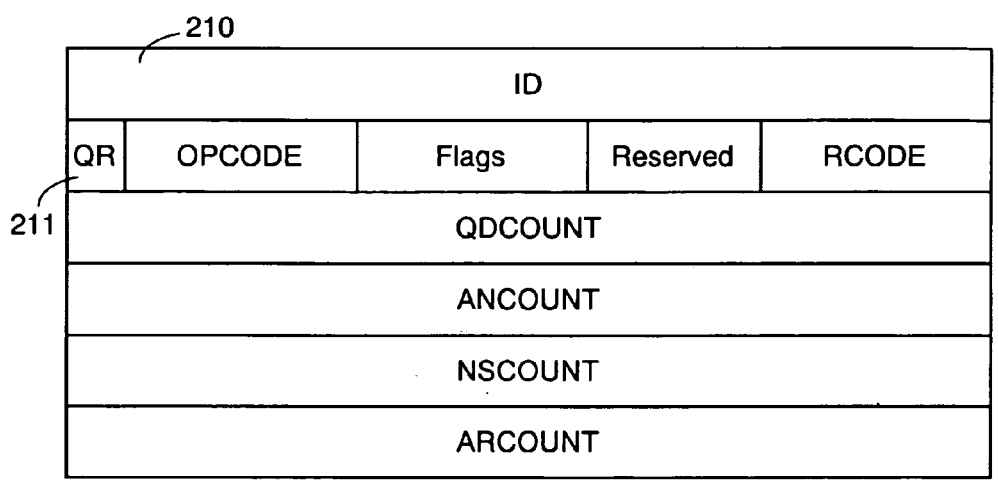
FIG. 6 shows the format of a header section of the DNS message.

As is shown in FIG. 6, the header section 21 is made up of an ID field 210 to contain a message ID uniquely assigned to the message, a QR field 211 to contain a flag to indicate if the message is a response to a query, an OPCODE field 212 to contain a value to designate the query type, a miscellaneous flags filed 213, a reserved field 214, an RCODE field 215 to contain a value to indicate the response type if the message is a response, a QDCOUNT field 216 to contain a value to indicate the number of entries contained in the question section, an ANCOUNT field 217 to contain a value to indicate the number of resource records contained in the answer section 23, an NSCOUNT field 218 to contain a value to indicate the number of resource records contained in the authority section 24, and an ARCOUNT field 219 to contain a value to indicate the number of resource records contained in the additional section 25.

Figure 7:
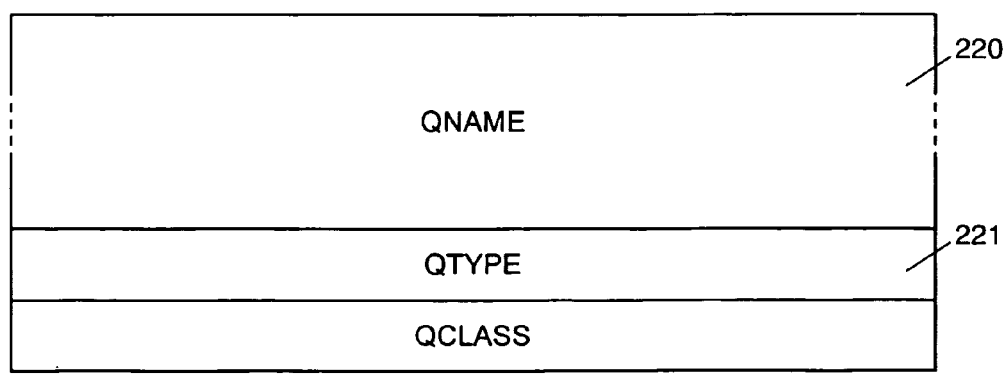
FIG. 7 shows the format of a question section of the DNS message.

As is shown in FIG. 7, the question section 22 is made up of a QNAME field 220, a QTYPE field 221, and a QCLASS field 222. The QNAME field 220 is a field to contain an FQDN for query and this field contains an FQDN for reverse lookup if the message is a reverse lookup query. The QTYPE field 221 contains a value to indicate the type of resource record for which the query is made.

Figure 8:
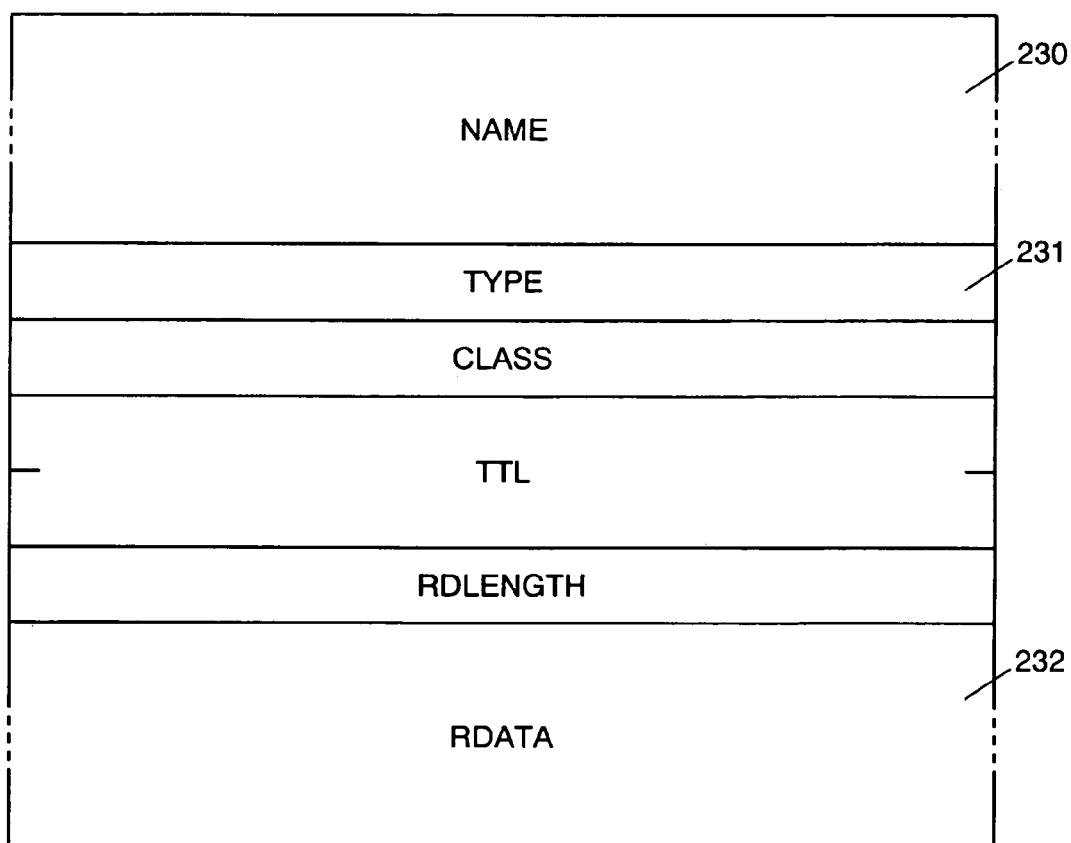
FIG. 8 shows the format common for answer, authority, and additional sections of the DNS message.

The answer section 23, authority section 24, and additional section 25 are made up of fields which are shown in FIG. 8 as those common to these sections. The fields comprise a NAME field 230 to contain an FQDN for query, a TYPE field 231 to contain a value to indicate the type of resource record for which the query is made, a TTL field to contain a time to live during which the query response is retained on the cache of the DNS proxy server 1a, an RDATA field 232 to contain a resolved-to-name (PTR record) as the query response, and other fields.

For data length compression purposes, if all or a part of an FQDN string is duplicated across two or more fields, one field should contain the complete FQDN string and other fields should contain a pointer to the beginning part of the FQDN string contained in the one field, instead of containing the FQDN. Upon receiving this DNS message, a device can obtain the FQDN by reading the pointer and referring to the field content pointed by the pointer.

If the DNS message is a reverse lookup query, the QR field 211 in the header section contains a flag value of 0 and the header section is followed by only the fields of the question section 22.

If the DNS message is a response to a reverse lookup query, the ID field 210 in the header section 21 contains a copy of the ID of the associated query message and the QR field 211 contains a flag value of 1. In the question section 22 of the response message, the contents of the question section 22 of the query message are stored as is.

In the reserve lookup query message of DNS, furthermore, the NAME field 230 in the answer section contains the above-mentioned IPv4 or IPv6 FQDN for reverse lookup, the TYPE field 231 contains a value of 12 indicating a PTR record, and the RDATA field 232 contains an FQDN assigned to the device having the specified address. However, because the content of the NAME field 230 in the answer section is usually the same as the content of the corresponding field in the question section, the NAME field 230 contains a pointer to the beginning of the FQDN for reverse lookup contained in the QNAME field 220 in the question section.

Then, how the DNS proxy server 1a operates upon receiving a DNS message is discussed.

DNS proxy server operation in a first instance where the DNS proxy server 1a receives a query of a reverse lookup on an IPv6 address is first discussed.

A DNS message received through the I/O interface 11 is passed to the DNS message analyzer 12.

The DNS message analyzer 12 analyzes the received DNS message content. If the DNS message includes an FQDN for reverse lookup appended with "ip6.arpa" (or "ip6.int."), the DNS message analyzer 12 determines that the DNS message is a reverse lookup query for a PTR record and extracts an IPv6 address from the FQDN for reverse lookup in this reverse lookup DNS message. Then, the DNS message analyzer 12 passes the IPv6 address to the substitutive address query message generator 13.

The substitutive address query message generator 13 searches the prefix-translator reference table 160 held on the IPv4/IPv6 translator information manager 16, using the extracted IPv6 address, obtains IPv4/IPv6 translator information mapped to the prefix of the previously extracted IPv6 address, and selects one IPv4/IPv6 translator. At this time, if a plurality of IPv4/IPv6 translators are obtained by the search, the message generator obtains information about the plurality of translators and selects one (or a plurality) of the IPv4/IPv6 translators.

Then, a query for an IPv4 address corresponding to the extracted IPv6 address is sent to the selected IPv4/IPv6 translator. At this time, if the corresponding IPv4 address cannot be obtained from the IPv4/IPv6 translator to which the query was sent, the same query for an IPv4 address corresponding to the extracted IPv6 address is sent to another selected IPv4/IPv6 translator. The query is repeated until the IPv4 address is obtained or sending the query to all the IPv4/IPv6 translators registered in the above prefix-translator reference table is completed. In this relation, a maximum number of times of query repetition may be set at a given number that an administrator should set beforehand.

A response including the IPv4 address corresponding to the IPv6 address sent back from the IPv4/IPv6 translator is received through the I/O interface 11 and received by the substitutive address notification message analyzer 14. The substitutive address notification message analyzer 14 extracts the IPv4 address from the response message and, thereby, the IPv4 address corresponding to the IPv6 address is obtained. The thus obtained IPv4 address is passed to the DNS message translator 15.

The DNS message translator 15 translates the obtained IPv4 address into an FQDN for reverse lookup and replaces the FQDN for IPv6 reverse lookup included in the question section in the initially received reverse lookup DNS message by the FQDN for reverse lookup including the IPv4 address, thus generating a new reverse lookup DNS message. The thus generated new reverse lookup DNS message is transmitted through the I/O interface 11 to another DNS server that holds name resolution information.

Otherwise, if such an IPv4 address cannot be obtained eventually even after repetitive queries to all the IPv4/IPv6 translator (after a predetermined number of times the query has been repeated), the received reverse lookup DNS message is transmitted as is to another DNS server that holds name resolution information.

Then, DNS proxy server operation in a second instance where the DNS proxy server 1a receives a query of a reverse lookup on an IPv4 address is discussed.

A DNS message received through the I/O interface 11 is passed to the DNS message analyzer 12.

The DNS message analyzer 12 analyzes the received DNS message content. If the DNS message includes an FQDN for reverse lookup appended with "in-addr.arpa", the DNS message analyzer 12 determines that the DNS message is a reverse lookup query for a PTR record and extracts an IPv4 address from the FQDN for reverse lookup in this reverse lookup DNS message. Then, the DNS message analyzer 12 passes the IPv4 address to the substitutive address query message generator 13.

The substitutive address query message generator 13 searches the prefix-translator reference table 160 held on the IPv4/IPv6 translator information manager 16, using the source IPv6 address of the reverse lookup query, obtains IPv4/IPv6 translator information mapped to the prefix of the source IPv6 address, and selects one (or a plurality) of the IPv4/IPv6 translators. A query for an IPv6 address corresponding to the IPv4 address is sent to the selected IPv4/IPv6 translator. At this time, as noted above, if a plurality of IPv4/IPv6 translators are obtained, the query may be repeated to the IPv4/IPv6 translators.

A response including the IPv6 address corresponding to the IPv4 address sent back from the IPv4/IPv6 translator as the result of the query is received through the I/O interface 11 and received by the substitutive address notification message analyzer 14. The substitutive address notification message analyzer 14 extracts the IPv6 address from the response message and, thereby, the IPv6 address corresponding to the IPv4 address is obtained. The thus obtained IPv6 address is passed to the DNS message translator 15.

The DNS message translator 15 translates the obtained IPv6 address into an FQDN for reverse lookup and replaces the IPv4 FQDN for reverse lookup included in the question section in the initially received reverse lookup DNS message by the FQDN for reverse lookup including the IPv6 address, thus generating a new reverse lookup DNS message. The thus generated new reverse lookup DNS message is transmitted through the I/O interface 11 to another DNS server that holds name resolution information.

At this time, the message ID included in the reverse lookup DNS message that is transmitted to another DNS server is mapped to the source IPv6 address of the reverse lookup query before the FQDN replacement and this mapping is registered into the message ID-IPv6 address reference table 190 (see FIG. 4) on the message ID manager 18.

Otherwise, if such an IPv6 address cannot be obtained eventually, the received reverse lookup DNS message is transmitted as is to another DNS server that holds name resolution information.

Next, DNS proxy server operation in a third instance where the DNS proxy server 1a receives a response to the query of a reverse lookup on an IPv4 address is discussed.

A DNS message received through the I/O interface 11 is passed to the DNS message analyzer 12.

The DNS message analyzer 12 analyzes the received DNS message content. When the DNS message analyzer 12 determines that the DNS message is a reply to a reverse lookup DNS message (the result of name resolution), it extracts an IPv4 address from the FQDN for reverse lookup stored in the question section 22 (see FIG. 6) of the DNS message, and passes the IPv4 address to the substitutive address query message generator 13.

The substitutive address query message generator 13 searches the prefix-translator reference table 160 held on the translator information manager 16, using the source IPv6 address of the reply to the reverse lookup, obtains IPv4/IPv6 translator information mapped to the prefix of the IPv6 address of the source that transmitted the reply to the reverse lookup message, and selects one (or a plurality) of the IPv4/IPv6 translators.

A query for an IPv6 address corresponding to the IPv4 address extracted by the DNS message analyzer 12 is transmitted through the I/O interface 11 to the selected IPv4/IPv6 translator, thus issuing a request for an IPv6 address to replace the extracted IPv4 address. At this time, as noted above, if information about a plurality of IPv4/IPv6 translators is obtained and the plurality of IPv4/IPv6 translators are selected, the query may be repeated to the IPv4/IPv6 translators.

When a response message including the IPv6 address corresponding to the IPv4 address is sent back from the IPv4/IPv6 translator, the response message is received through the I/O interface 11 and received by the substitutive address notification message analyzer 14. The substitutive address notification message analyzer 14 extracts the IPv6 address from the response message and passes the IPv6 address to the DNS message translator 15.

The DNS message translator 15 replaces the IPv4 FQDN for reverse lookup stored in the question section 22 and the answer section 23 (see FIG. 7) of the reverse lookup response message received from a DNS server by an FQDN for reverse lookup converted from the IPv6 address received from the IPv4/IPv6 translator, thus generating a new response message, and transmits the new response message to the query sender of the reverse lookup DNS message through the I/O interface 11.

At this time, if the pointer to the QNAME field in the question section 22 is stored in the answer section 23, the pointer position is changed by the above FQDN replacement. Accordingly, the pointer must be corrected to a pointer to the beginning of the replaced FQDN string for reverse lookup in the question section 22.

Otherwise, if the IPv6 address cannot be obtained eventually, the received response message is transmitted as is to the query sender of the reverse lookup DNS message.

Finally, DNS proxy server operation in a fourth instance where the DNS proxy server 1a receives a response to the query of a reverse lookup on an IPv6 address is discussed.

A DNS message received through the I/O interface 11 is passed to the DNS message analyzer 12.

The DNS message analyzer 12 analyzes the received DNS message content. When the DNS message analyzer 12 determines that the DNS message is a response to a query for a PTR record associated with an "ip6.arpa" or "ip6.int" domain in a DNS message (the result of name resolution), it extracts an IPv6 address from the FQDN for reverse lookup stored in the question section 22 (see FIG. 6) of the DNS message, and passes the IPv6 address to the substitutive address query message generator 13.

The substitutive address query message generator 13 searches message ID-IPv6 address reference table 190 held on the message ID manager 18, using the message ID of the received response to the reverse lookup query, obtains the IPv6 address mapped to the message ID.

Furthermore, the substitutive address query message generator 13 searches prefix-translator reference table 160 held on the IPv4/IPv6 translator information manager, using the obtained IPv6 address, obtains IPv4/IPv6 translator information mapped to the obtained IPv6 address prefix, and selects one (or a plurality) of the IPv4/IPv6 translators.

A query for an IPv4 address corresponding to the IPv6 address extracted by the DNS message analyzer 12 is transmitted through the I/O interface 11 to the selected IPv4/IPv6 translator, thus issuing a request for an IPv4 address to replace the extracted IPv6 address. At this time, as noted above, if a plurality of IPv4/IPv6 translators are obtained, the query may be repeated to the IPv4/IPv6 translators.

When a response message including the IPv4 address corresponding to the IPv6 address is sent back from the IPv4/IPv6 translator, the response message is received through the I/O interface 11 and received by the substitutive address notification message analyzer 14. The substitutive address notification message analyzer 14 extracts the IPv4 address from the response message and passes the IPv6 address to the DNS message translator 15. The DNS message translator 15 replaces the IPv6 FQDN for reverse lookup stored in the question section 22 and the answer section 23 (see FIG. 7) of the reverse lookup response message received from a DNS server by an FQDN for reverse lookup converted from the IPv4 address received from the IPv4/IPv6 translator, thus generating a new response message, and transmits the new response message to the query sender of the reverse lookup DNS message through the I/O interface 11.

At this time, if the pointer is stored in the answer section 23, the pointer position is changed by the above FQDN replacement. Accordingly, the pointer must be corrected to a pointer to the beginning of the replaced FQDN string for reverse lookup in the question section 22.

Otherwise, if the IPv4 address cannot be obtained eventually, the received response message is transmitted as is to the query sender of the reverse lookup DNS message.

Then, in the communications network system of the first embodiment, when an IPv4 client issues a request for a reverse lookup on the address of an IPv6 client, how the DNS proxy server and related devices cooperate to complete the request is discussed.

In the topology shown in FIG. 1, it is assumed that the addresses and names of the clients are initially set as below.

The IPv4 client 412 is assigned FQDN "hostX.v4.net" and IPv4 address "192.168.0.2".

The IPv6 client 602 is assigned FQDN "hostY.v6.net" and IPv6 address "2001::1". The DNS server 601 connected to the IPv6 network 600 is configured to be able to reply to a request for a reverse lookup on an IPv6 address that falls within a subnet "2001::/96" and to make a name resolution in this subnet range. Moreover, the DNS proxy server 1a is set up to transfer a reverse lookup query for an IPv6 address that falls within the subnet "2001::/96" to the DNS server 601.

The IPv4/IPv6 translator 101 assigns a temporary IPv4 address "10.0.0.1" to the IPv6 client 602 and maps the IPv6 address "2001::1" to the IPv4 address "10.0.0.1"; this mapping is registered in the address translation table.

The IPv4/IPv6 translator 101 generates, for all devices connected to the IPv4 network 400, a temporary IPv6 address by adding a prefix "3ffe:1::/96" to the device's IPv4 address. Moreover, address translation information on the DNS proxy server 1a is registered on the IPv4/IPv6 translator 101 as well beforehand.

The IPv4/IPv6 translator 102 generates, for all devices connected to the IPv4 network 410, a temporary IPv6 address by adding a prefix "3ffe:2::/96" to the device's IPv4 address. Address translation information on the DNS proxy server 1a is registered on the IPv4/IPv6 translator 102 as well beforehand as is the case for the IPv6 translator 101.

The DNS proxy server 1a holds the mapping between the IPv6 address prefix "3ffe:1::/96" and the IPv4/IPv6 translator 101 and the mapping between the prefix "3ffe:2::/96" and the IPv4/IPv6 translator 102.

Figure 9:
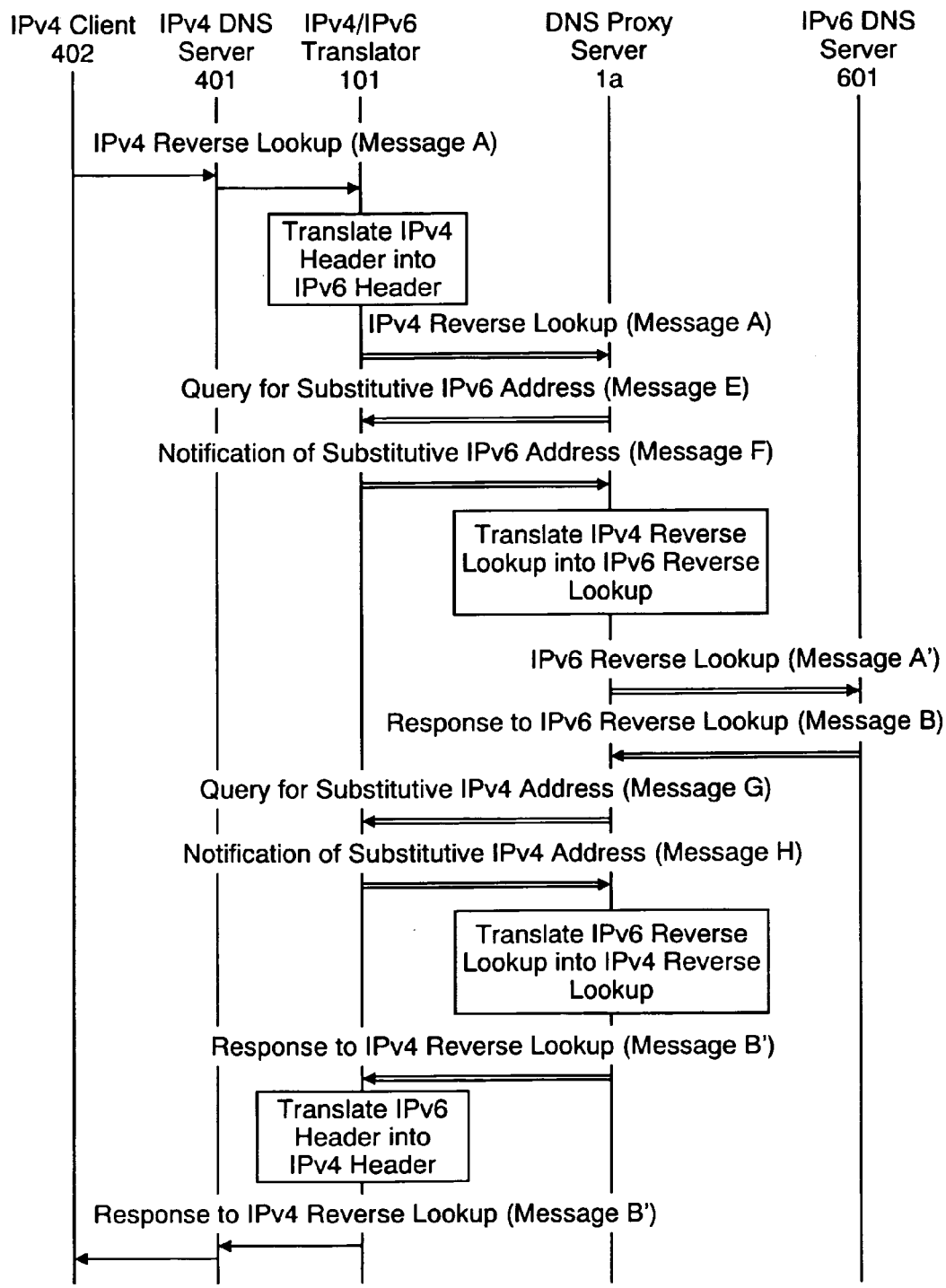
FIG. 9 is a sequence diagram of a process for completing a request issued from an IPv4 client for a reverse lookup on the address of an IPv6 client in accordance with the first embodiment.

FIG. 9 is a sequence diagram of a process for completing a request issued from the IPv4 client 402 for a reverse lookup on the address of the IPv6 client 602.

The IPv4 client 402 transmits a message A of query for the name of the device assigned the IPv4 address "10.0.0.1" to the nearest DNS server 401. The DNS server 401 transfers the message A to the DNS proxy server 1a, if the server is unable to make the name resolution by itself. In the course of the message transfer from the IPv4 network 400 to IPv6 network 600, this message A is converted from an IPv4 packet to IPv6 packet form at the IPv4/IPv6 translator 101 and the IPv6 packet message arrives on the DNS proxy server 1a.

Upon receiving the message A, the DNS proxy server 1a parses an FQDN "1.0.0.10.in-addr.arpa" for reverse lookup stored in the question section 22 of the message and extracts the IPv4 address "10.0.0.1".

Next, the DNS proxy server 1a searches the prefix-translator reference table 160 on the IPv4/IPv6 translator information manager 16, using the source IPv6 address of the message A, obtains information of an IPv4/IPv6 translator 101 mapped to the prefix "3ffe:1::/96" of the source address of the message A, and selects the IPv4/IPv6 translator 101 mapped to the prefix.

Then, the DNS proxy server 1a transmits an IP packet E of query for a substitutive IPv6 address corresponding to the address "10.0.0.1" to the selected IPv4/IPv6 translator 101.

Upon having received the IP packet E (query for a substitutive IPv6 address), the IPv4/IPv6 translator 101 refers to the address translation table to search for an IPv6 address corresponding to the address "10.0.0.1", obtains "2001::1" as the corresponding IPv6 address, and transmits a reply IP packet F for notification of the substitutive IPv6 address back to the DNS proxy server 1a.

The DNS proxy server 1a generates an IPv6 FQDN for reverse lookup from the IPv6 address included in the IP packet F (the substitutive IPv6 address as the reply) received from the IPv4/IPv6 translator 101, replaces the FQDN "1.0.0.10.in-addr.arpa" for reverse lookup in the question section 22 of the message A by the generated FQDN "¥[x20010000000000000000000000000001/128¥].ip6.arpa" for reverse lookup, and transmits a message A' in which the QNAME field in the question section contains the converted-to-FQDN to a DNS server 601. At this time, the DNS proxy server 1a maps the message ID of the message A' to the source IPv6 address of the message A and stores this mapping into the message ID-IPv6 address reference table 190 on the message ID manager.

Upon having received the message A', in response to the message A', the DNS server 601 transmits a reply message B for notification of a PTR record (domain name) "hostY.v6.net" corresponding to the FQDN "¥[x20010000000000000000000000000001/128¥].ip6.arpa" back to the DNS proxy server 1a.

In the message B, the QNAME field in the question section 22 contains the IPv6 FQDN "¥[x20010000000000000000000000000001/128¥].ip6.arpa" for reverse lookup and the NAME field in the answer section 23 contains the pointer to the beginning of the FQDN string in the QNAME field in the question section 22.

Upon receiving the message B, the DNS proxy server 1a parses the FQDN "¥[x20010000000000000000000000000001/128¥].ip6.arpa" for reverse lookup stored in the question section 22 of the message B and extracts the IPv6 address "2001::1" of the IPv6 client 602.

Then, the DNS proxy server 1a searches the message ID-IPv6 address reference table 190 on the message ID manager 18, using the ID of the message B, and obtains the source address (IPv6 address) "3ffe:1::c0a8:1" mapped to the ID of the message B, because the ID of the message B is the same as the previously registered ID of the message A'. Furthermore, the DNS proxy server 1a searches the prefix-translator reference table 160 on the IPv4/IPv6 translator information manager 16, using the thus obtained IPv6 address, obtains information of the IPv4/IPv6 translator 101 mapped to the IPv6 prefix "3ffe:1::/96", and selects the IPv4/IPv6 translator 101 mapped to the prefix.

Then, the DNS proxy server 1a transmits an IP packet G of query for a substitutive IPv4 address corresponding to the address "2001::1" to the IPv4/IPv6 translator 101.

Upon having received the IP packet G (query for a substitutive IPv4 address), the IPv4/IPv6 translator 101 refers to the address translation table to search for an IPv4 address corresponding to the address "2001::1", obtains "10.0.0.1" as the corresponding IPv4 address, and transmits a reply IP packet H for notification of the substitutive IP address back to the DNS proxy server 1a.

The DNS proxy server 1a generates an IPv4 FQDN for reverse lookup from the IPv4 address included in the IP packet H (the substitutive IPv4 address as the reply) received from the IPv4/IPv6 translator 101 and replaces the FQDN "¥[x20010000000000000000000000000001/128¥].ip6.arpa" for reverse lookup in the question section of the message B by the generated FQDN "1.0.0.10.in-addr.arpa" for reverse lookup. The DNS proxy server 1a transmits a message B' in which the QNAME field in the question section contains the converted-to-FQDN and the pointer to the QNAME field has been modified to the IPv4 client 402.

In the course of the message transfer from the IPv6 network 600 to the IPv4 network 400, the message B' is converted from an IPv4 packet to IPv6 packet form at the IPv4/IPv6 translator 101 and the IPv6 packet message arrives on the IPv4 client 402.

As the result of receiving the message B', the IPv4 client 402 obtains information that the name of the device having the IPv4 address "10.0.0.1" is "hostY.v6.net".

Through the above-described process, the reverse lookup on the IPv6 address from the IPv4 network side is complete.

Next, when an IPv6 client issues a request for a reverse lookup on the address of an IPv4 client, how the DNS proxy server and related devices cooperate to complete the request is discussed.

Figure 10:
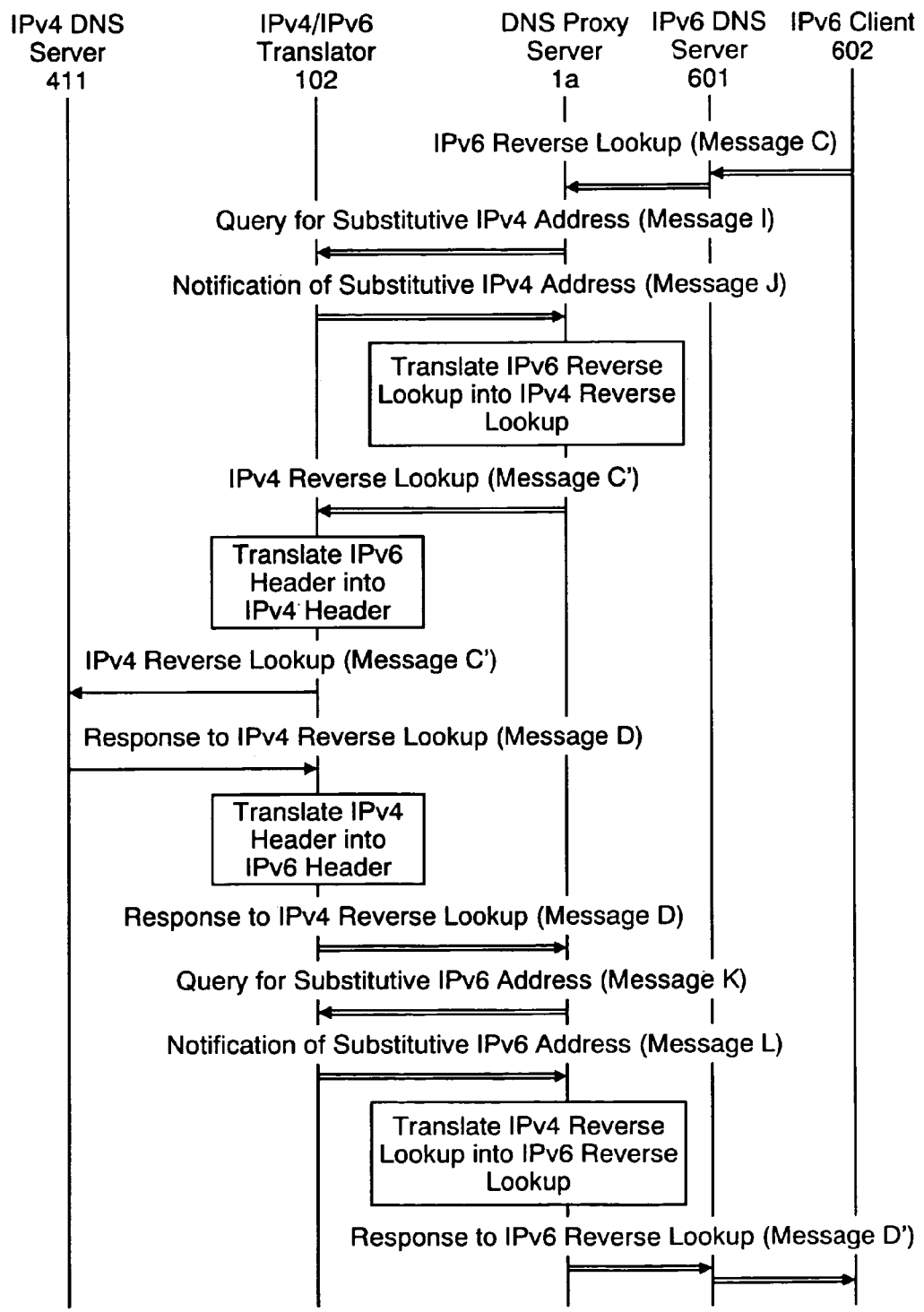
FIG. 10 is a sequence diagram of a process for completing a request issued from an IPv6 client for a reverse lookup on the address of an IPv4 client in accordance with the first embodiment.

FIG. 10 is a sequence diagram of a process for completing a request issued from the IPv6 client 602 for a reverse lookup on the address of the IPv6 client 412.

The IPv6 client 602 transmits a message C of query for the name of the device assigned the IPv6 address "3ffe:2::c0a8:2" to the nearest DNS server 601. The DNS server 601 transfers the message C to the DNS proxy server 1a, if the server is unable to make the name resolution by itself.

Upon receiving the message C, the DNS proxy server 1a parses an FQDN "¥[x3ffe00020000000000000000c0a80002/128¥].ip6.arpa" for reverse lookup stored in the question section 22 of the message and extracts the IPv6 address "3ffe:2::c0a8:2".

Next, the DNS proxy server 1a searches the prefix-translator reference table 160 on the IPv4/IPv6 translator information manager 16, using the extracted IPv6 address, obtains information of an IPv4/IPv6 translator 102 mapped to the prefix "3ffe:2::/96" of the IPv6 address of the device about which the query is made by using the message C, and selects the IPv4/IPv6 translator 102 mapped to the prefix.

Then, the DNS proxy server 1a transmits an IP packet I of query for a substitutive IPv4 address corresponding to the address "3ffe:2::c0a8:2" to the selected IPv4/IPv6 translator 102.

Upon having received the IP packet I (query for a substitutive IPv4 address), the IPv4/IPv6 translator 102 refers to the address translation table to search for an IPv4 address corresponding to the address "3ffe:2::c0a8:2", obtains "192.168.0.2" as the corresponding IPv4 address, and transmits a reply IP packet J for notification of the substitutive IP address back to the DNS proxy server 1a.

The DNS proxy server 1a generates an IPv4 FQDN for reverse lookup from the IPv4 address included in the IP packet J (the substitutive IPv4 address as the reply) received from the IPv4/IPv6 translator 102, replaces the FQDN "¥[x3ffe00020000000000000000c0a80002/128¥].ip6.arpa" for reverse lookup in the question section 22 of the message C by the generated FQDN "2.0.168.192.in-addr.arpa" for reverse lookup, and transmits a message C' in which the QNAME field in the question section contains the converted-to-FQDN to a DNS server 411. In the course of the message transfer from the IPv6 network 600 to the IPv4 network 400, the message C' is converted from an IPv6 packet to IPv4 packet form at the IPv4/IPv6 translator 102 and the IPv4 packet message arrives on the DNS server 411.

Upon having received the message C', in response to the message C', the DNS server 411 transmits a reply message D for notification of a PTR record (domain name) "hostX.v4.net" corresponding to the FQDN "2.0.168.192.in-addr.arpa" back to the DNS proxy server 1a.

In the course of the message transfer from the IPv4 network 400 to the IPv6 network 600, the message D is converted from an IPv4 packet to IPv6 packet form at the IPv4/IPv6 translator 102 and the IPv6 packet message arrives on the DNS proxy server 1a. In this message D, the QNAME field in the question section 22 contains the IPv4 FQDN "2.0.168.192.in-addr.arpa" for reverse lookup and the NAME field in the answer section 23 contains the pointer to the beginning of the FQDN string in the QNAME field in the question section 22.

Upon receiving the message D, the DNS proxy server 1a parses the FQDN "2.0.168.192.in-addr.arpa" for reverse lookup stored in the question section 22 of the message D and extracts the IPv4 address "192.168.0.2" of the IPv4 client 412.

Next, the DNS proxy server 1a searches the prefix-translator reference table 160 on the IPv4/IPv6 translator information manager 1, using the source IPv6 address of the message D, obtains information of an IPv4/IPv6 translator 102 mapped to the prefix "3ffe:2::/96" of the source address of the message D, and selects the IPv4/IPv6 translator 102 mapped to the prefix.

Then, the DNS proxy server 1a transmits an IP packet K of query for a substitutive IPv6 address corresponding to the "192.168.0.2" address (query for a substitutive IPv6 address) to the IPv4/IPv6 translator 102.

The IPv4/IPv6 translator 102 refers to the address translation table to search for an IPv6 address corresponding to the "192.168.0.2" address, obtains "3ffe:2::c0a8:2" as the corresponding IPv6 address, and transmits a reply IP packet L for notification of the substitutive IP address back to the DNS proxy server 1a.

The DNS proxy server 1a generates an IPv6 FQDN for reverse lookup from the IPv6 address included in the IP packet L (the substitutive IPv6 address as the reply) received from the IPv4/IPv6 translator 102 and replaces the FQDN "2.0.168.192.in-addr.arpa" for reverse lookup in the question section of the message D by the generated FQDN "¥[x3ffe00020000000000000000c0a80002/128¥].ip6.arpa". The DNS proxy server 1a transmits a message D' in which the QNAME field in the question section contains the converted-to-FQDN and the pointer to the QNAME field has been modified to the IPv6 client 602.

As the result of receiving the message D' with the replaced FQDN, the IPv6 client 602a obtains information that the name of the device having the IPv6 address "3ffe:2::c0a8:2" is "hostX.v4.net".

Through the above-described process, the reverse DNS lookup on the IPv4 address from the IPv6 network side is complete.

In the first embodiment discussed hereinbefore, even if an IPv4 network and an IPv6 network are connected via a plurality of IPv4/IPv6 translators, the IPv6 network includes the DNS proxy server 1a for serving a request to a DNS server and this DNS proxy server 1a reads the prefix of a destination address of a DNS request message, selects an IPv4/IPv6 translator mapped to the prefix, requests the selected IPv4/IPv6 translator to make IPv4/IPv6 address translation, and sends a request modified with a translated-to-address to a DNS server. Thereby, a reverse lookup on an IP address requested can be processed through a DNS server even in the network topology via a plurality of IPv4/IPv6 translators.

Next, a second embodiment of the invention is discussed with reference to the accompanying drawings.

Figure 11:
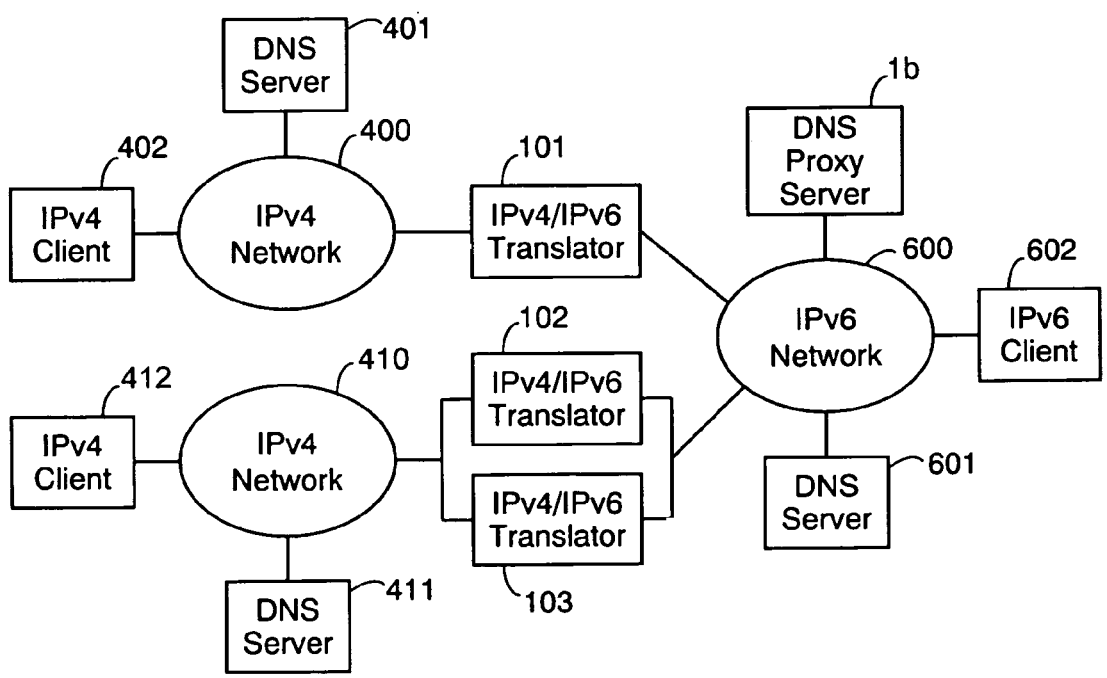
FIG. 11 is a diagram depicting the topology of a communications network system including a DNS proxy server in accordance with a second embodiment of the present invention.
Figure 12:
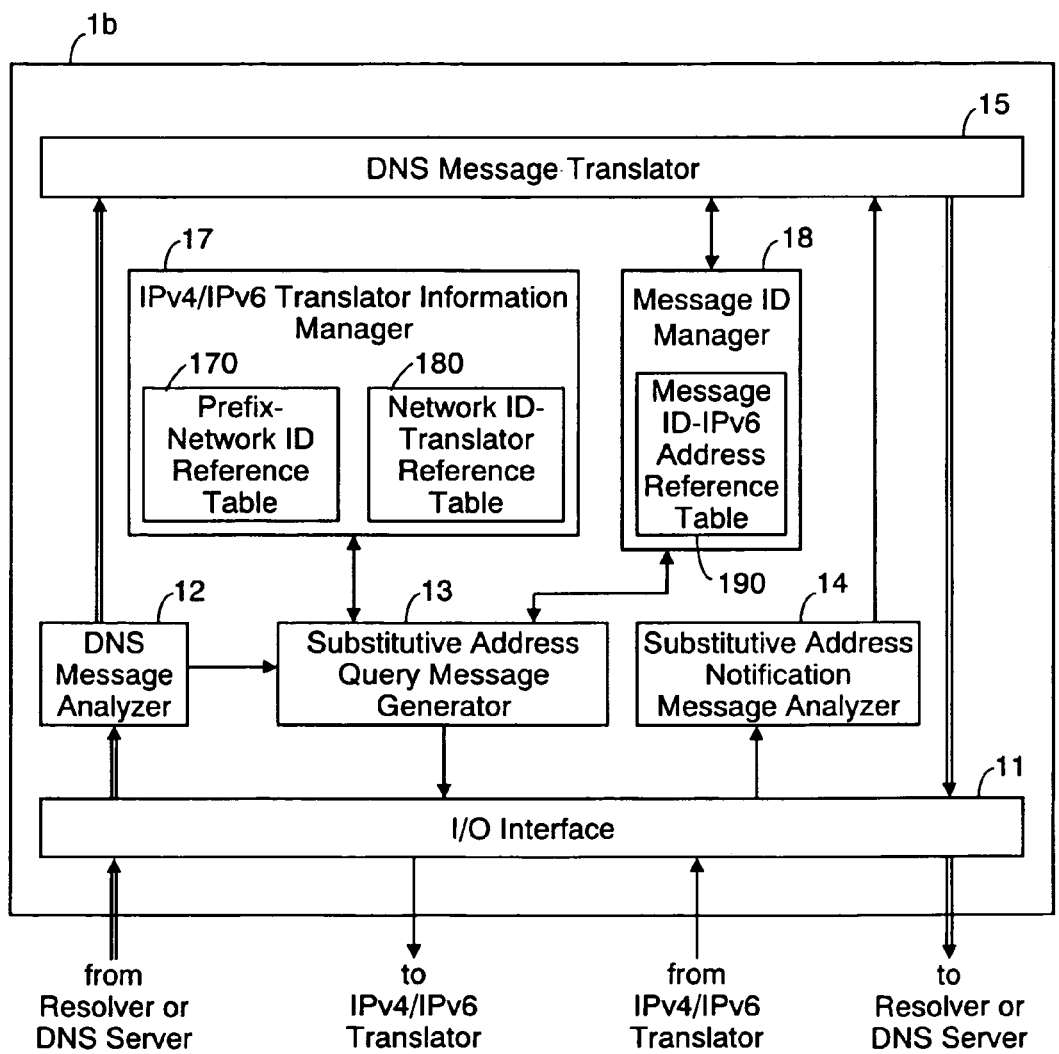
FIG. 12 is a block diagram showing the configuration of the DNS proxy server of the second embodiment.

FIG. 11 is a diagram depicting the topology of a communications network system including a DNS proxy server in accordance with the second embodiment of the present invention.

Compared with the network topology of the first embodiment, there is a difference from the first embodiment in that a plurality of IPv4/IPv6 translators 102 and 103 are connected to the IPv4 network 410. Nodes and devices corresponding to those shown in the network topology of the first embodiment are assigned the same reference numbers and their explanation is not repeated.

The IPv6 network 600 is connected to the IPv4 network 400 via the IPv4/IPv6 translator 101 and also connected to the IPv4 network 410 via the IPv4/IPv6 translator 102 or 103.

Like the IPv4/IPv6 translators 101 and 102, the IPv4/IPv6 translator 103 is a device for translating IPv4 to IPv6 addressing and vice versa for the destination and source addresses of an IP packet transferred thereto across the network to which it is connected.

The IPv4/IPv6 translators 102 and 103 are responsible for different prefix ranges and make IP address translation within the prefix range that each is assigned to handle.

FIG. 2 is a block diagram showing the configuration of the DNS proxy server 1b in accordance with the second embodiment of the invention.

Compared with the DNS proxy server 1a of the first embodiment, the DNS proxy server 1b differs from the one of the first embodiment in that an IPv4/IPv6 translator information manager 17 has a prefix-network ID reference table 170 to retain mappings between IPv6 prefix values and network IDs and a network ID-translator reference table 180 to retain mappings between network IDs and IPv4/IPv6 translators.

Components of the DNS proxy server 1b corresponding to those of the DNS proxy server 1a of Embodiment are assigned the same reference numbers and their explanation is not repeated.

FIG. 13 shows exemplary contents of the prefix-network ID reference table 170.

The prefix-network ID reference table 170 retains mappings between IPv6 prefix values and network IDs, each of which is assigned to each network associated with a prefix value.

Specifically, the prefix-network ID reference table 170 consists of a column 171 for prefix entry and a column 172 for network ID entry. Furthermore, the column 171 consists of a field 173 in which a 128-bit IPv6 address value is registered and a field 174 in which the length in bits of the prefix part of the IPv6 address, from the beginning, is registered.

FIG. 14 shows exemplary contents of the network ID-translator reference table 180.

The network ID-translator reference table 180 retains mappings between network IDs, each of which is assigned to each network, and the addresses of the IPv4/IPv6 translators, each of which is responsible for address translation for packets carried across each network.

Specifically, the network ID-translator reference table 180 consists of a column 181 for network ID entry and a column 182 for IPv4/IPv6 translator information entry. The IPv4/IPv6 translator information column 182 consists of a field 183 in which the IPv6 address of an IPv4/IPv6 translator is registered and a field 184 in which the UDP port number of the IPv4/IPv6 translator is registered.

Then, a process for completing a request issued from an IPv6 client 602 for a reverse lookup for an IPv4 client 412 is discussed.

Here, in the topology shown in FIG. 11, it is assumed that the addresses and names of the clients are initially set as below.

The IPv4/IPv6 translator 102 generates, for all devices connected to the IPv4 network 410, a temporary IPv6 address by adding a prefix "3ffe:2::/96" to the device's IPv4 address. Likewise, the IPv4/IPv6 translator 103 generates, for all devices connected to the IPv4 network 410, a temporary IPv6 address by adding a prefix "3ffe:3::/96" to the device's IPv4 address.

Moreover, address translation information on the DNS proxy server 1b is registered on the IPv4/IPv6 translator 102 and 103 as well beforehand.

In the prefix-network ID reference table 170 held within the DNS proxy server 1b, both the IPv6 address prefixes "3ffe:2::/96" and "3ffe:3::/96" are mapped to network ID 1. In the network ID-translator reference table 180, network ID 1 is mapped to the IPv4/IPv6 translators 102 and 103, and messages of request for a substitutive address are transmitted to these two translators alternately.

Initially, the IPv6 client 602 transmits a message of query for the name of the device having an IPv6 address "3ffe:2::c0a8:2" to the nearest DNS server 601. The DNS server 601 transfers the query message to the DNS proxy server 1b, if the server is unable to make the name resolution by itself.

Upon receiving the query message, the DNS proxy server 1b parses an FQDN "¥[x3ffe00020000000000000000c0a80002/128¥].ip6.arpa" for reverse lookup stored in the question section 22 of the message and extracts the IPv6 address "3ffe:2::c0a8:2" specified by the query sender.

Next, the DNS proxy server 1b searches the prefix-network ID reference table 170 on the IPv4/IPv6 translator information manager 17, using the extracted IPv6 address and obtains network ID "1" mapped to the prefix "3ffe.:2::/96" of the IPv6 address of the device about which the query is made by using the query message. Using the thus obtained network ID, the DNS proxy server 1b searches the network ID-translator reference table 180, obtains information of IPv4/IPv6 translators 102 and 103 mapped to the network ID "1", and selects the IPv4/IPv6 translators 102 and 103 associated with the prefix.

Then, the DNS proxy server 1b transmits an IP packet of query for a substitutive IPv4 address corresponding to the address "3ffe:2::c0a8:2" to either of the selected two IPv4/IPv6 translators (for example, an IPv4/IPv6 translator 102).

Upon having received the IP packet (query for a substitutive IPv4 address), the IPv4/IPv6 translator 102 refers to the address translation table to search for an IPv4 address corresponding to the address "3ffe:2::c0a8:2", obtains "192.168.0.2" as the corresponding IPv4 address, and transmits a reply IP packet J for notification of the substitutive IP address back to the DNS proxy server 1b.

The DNS proxy server 1b generates an IPv4 FQDN for reverse lookup from the IPv4 address included in the IP packet (the substitutive IPv4 address as the reply) received from the IPv4/IPv6 translator 102, replaces the FQDN "¥[x3ffe00020000000000000000c0a80002/128¥].ip6.arpa" for reverse lookup in the question section 22 of the above query message by the generated FQDN "2.0.168.192.in-addr.arpa" for reverse lookup, and transmits a query message in which the QNAME field in the question section contains the converted-to-FQDN to a DNS server 411.

In the course of the message transfer from the IPv6 network 600 to the IPv4 network 410, the query message with the converted-to-FQDN is converted from an IPv6 packet to IPv4 packet form at the IPv4/IPv6 translator 102 and the IPv4 packet message arrives on the DNS server 411.

Upon having received this message, in response to the message, the DNS server 411 transmits a reply message for notification of a PTR record (domain name) "hostX.v4.net" for the FQDN "2.0.168.192.in-addr.arpa" back to the DNS proxy server 1b.

In the course of the message transfer from the IPv4 network 410 to the IPv6 network 600, this reply message is converted from an IPv4 packet to IPv6 packet form at the IPv4/IPv6 translator 102 and the IPv6 packet message arrives on the DNS proxy server 1b. In this message, the QNAME field in the question section 22 contains the IPv4 FQDN "2.0.168.192.in-addr.arpa" for reverse lookup and the NAME field in the answer section 23 contains the pointer to the beginning of the FQDN string in the QNAME field in the question section 22.

Upon receiving the reply message, the DNS proxy server 1b parses the FQDN "2.0.168.192.in-addr.arpa" for reverse lookup stored in question section 22 of the message and extracts the IPv4 address "192.168.0.2" of the IPv4 client 412.

Next, the DNS proxy server 1b searches the prefix-network ID reference table 170 on the IPv4/IPv6 translator information manager 17, using the source IPv6 address of the reply to the reverse lookup query and obtains network ID 1 mapped to the prefix "3ffe:2::/96" of the source address of the reply message. Using the thus obtained network ID, the DNS proxy server 1b further searches the network ID-translator reference table 180, obtains information of IPv4/IPv6 translators 102 and 103 mapped to the network ID 1, and selects an IPv4/IPv6 translator 102 associated with the prefix.

The DNS proxy server 1b first transmits an IP packet of query for a substitutive IPv6 address corresponding to the address "192.168.0.2" to either of the thus obtained two IPv4/IPv6 translators (for example, an IPv4/IPv6 translator 103).

The IPv4/IPv6 translator 103 refers to the address translation table to search for an IPv6 address corresponding to the address "192.168.0.22", but such IPv6 address does not exist in the table. Consequently, the IPv4/IPv6 translator 103 transmits an error response back to the DNS proxy server 1b.

Upon receiving the error response from the IPv4/IPv6 translator 103, the DNS proxy server 1b transmits the IP packet of query for a substitutive IPv6 address corresponding to the address "192.168.0.2" to the other IPv4/IPv6 translator 102.

Upon having received the IP packet (query for a substitutive IPv6 address), the IPv4/IPv6 translator 102 refers to the address translation table to search for an IPv6 address corresponding to the address "192.168.0.2", obtains "3ffe:2::c0a8:2" as the corresponding IPv6 address, and transmits a reply packet for notification of the substitutive IP address back to the DNS proxy server 1b.

The DNS proxy server 1b generates an IPv6 FQDN for reverse lookup from the IPv6 address included in the IP packet (the substitutive IPv6 address as the reply) received from the IPv4/IPv6 translator 102 and replaces the FQDN "2.0.168.192.in-addr.arpa" for reverse lookup in the question section of a message F by the generated FQDN "¥[x3ffe00020000000000000000c0a80002/128¥].ip6.arpa". The DNS proxy server 1b transmits a message F' in which the QNAME field in the question section contains the converted-to-FQDN and the pointer to the QNAME field has been modified to the IPv6 client 602.

As the result of receiving this message with the replaced FQDN, the IPv6 client 602 obtains information that the name of the device having the IPv6 address "3ffe:2::c0a8:2" is "hostX.v4.net".

Through the above-described process, the reverse DNS lookup on the IPv4 address from the IPv6 network side is complete.

In the second embodiment discussed hereinbefore, a reverse lookup request to a DNS server can be completed even in the network topology via a plurality of IPv4/IPv6 translators, as is the case in the first embodiment. Especially, even in a situation where a plurality of IPv4/IPv6 translators which are responsible for different prefix ranges are provided on a same network, a reverse DNS lookup can be performed by reference to the network ID-translator reference table 180 that retains mappings between individual network IDs and IPv4/IPv6 translators.

Next, a third embodiment of the invention is discussed with reference to the accompanying drawing.

Figure 15:
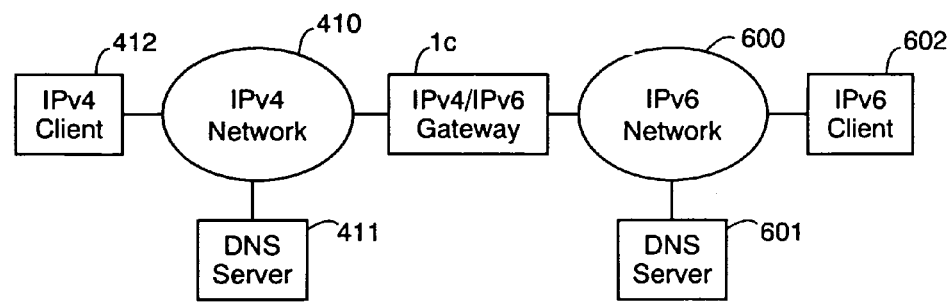
FIG. 15 is a diagram depicting the topology of a communications network system including a node in which a DNS proxy server and IPv4/IPv6 translators are integrated, according to a third embodiment of the present invention.

FIG. 15 is a diagram depicting the topology of a communications network system including a node in which a DNS proxy server and IPv4/IPv6 translators are integrated, according to the third embodiment of the present invention.

The IPv4 network 410 and IPv6 network 600 are connected via an IPv4/IPv6 gateway 1c. This IPv4/IPv6 gateway 1c incorporates the functionality of the DNS proxy server 1b and the functionality of the plurality of IPv4/IPv6 translators 101, 102, and 103 which have been described in the second embodiment of the present invention. Nodes and devices which operate the same as in Embodiments 1 and 2 are assigned the same reference numbers and their explanation is not repeated.

Figure 16:
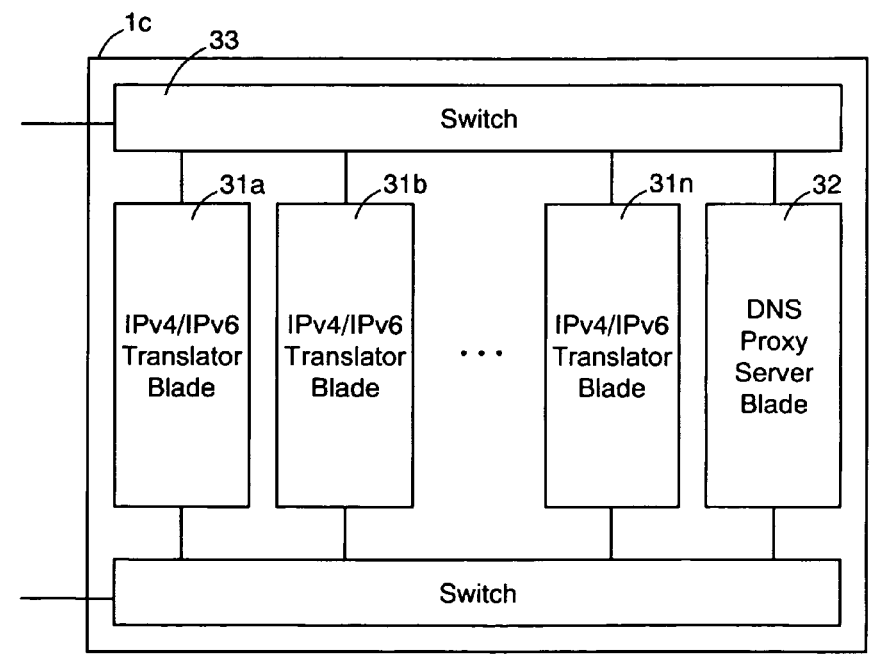
FIG. 16 is a block diagram showing the configuration of an IPv4/IPv6 gateway of the third embodiment.

FIG. 16 is a block diagram showing the configuration of the IPv4/IPv6 gateway 1c of the third embodiment of the present invention.

This IPv4/IPv6 gateway 1c comprises a DNS proxy server blade 32 which provides functionality equivalent to the functionality of the DNS proxy server 1b of the second embodiment, IPv4/IPv6 translator blades 31a to 31n, each providing functionality equivalent to the functionality of an IPv4/IPv6 translator, and switches 33.

On an IPv4/IPv6 translator blade 31, a program runs to implement the same functionality as the IPv4/IPv6 translator 102 or 103 of the second embodiment. A plurality of IPv4/IPv6 translator blades 31 are installed in the IPv4/IPv6 gateway 1c and each translator blade is assigned an IPv4 address and an IPv6 address.

On the DNS proxy server blade 32, a program runs to implement the same functionality as the DNS proxy server 1b of the second embodiment.

Each blade is a computer device comprising a CPU, storage, and a communication device.

A switch 33 routes a packet to an appropriate blade and outputs a processed packet to a network, according to its destination address.

IP packets input from each network are routed by the switch to one of the IPv4/IPv6 translator blades 31a to 31n or the DNS proxy server blade 32.

Subsequent process flow is the same as described in the second embodiment and, therefore, its explanation is not repeated.

In the third embodiment configured as described above, by means of a single unit of the IPv4/IPv6 gateway 1c including the DNS proxy server 32, a redundant configuration of the IPv4/IPv6 translators 31a to 31n can be realized, in addition to the advantageous effect of the second embodiment.

What is claimed is:

1. A packet-switched communication apparatus which forwards packets pertaining to communication setup between two client terminals, one terminal being attached to a first network and the other terminal being attached to a second network, wherein said first network which carries packets by using a first protocol and said second network which carries packets by using a second protocol are connected via an address translator, said packet-switched communication apparatus comprising:

mapping retaining means for retaining mappings between network-dependent parts of addresses which are used in said first network and address translators;

address translator selecting means for selecting one of said address translators, based on an address included in a received packet;

address obtaining means for obtaining a substitutive address to replace the address included in the received packet from the selected address translator; and address replacement means for replacing the address included in the received packet by using the obtained substitutive address.

2. The packet-switched communication apparatus according to claim 1, wherein said first network and said second network run different protocols of a third layer, and wherein said address to be replaced is included in a section which is a fourth layer or higher of the received packet.

3. The packet-switched communication apparatus according to claim 1, wherein said mapping retaining means may retain a plurality of address translators mapped to one network-dependent part of an address included in the received packet, and wherein said address obtaining means selects one of said plurality of address translators associated with an address included in the received packet and sends a request to the selected address translator to obtain said substitutive address.

4. The packet-switched communication apparatus according to claim 3, wherein, after said address obtaining means sends a request for said substitutive address to any address translator selected from said plurality of address translators, if said address obtaining means fails to obtain said substitutive address from the address translator, said address obtaining means selects another address translator out of said plurality of address translators and sends a request for said substitutive address to said another address translator.

5. The packet-switched communication apparatus according to claim 3, wherein said address obtaining means repeats the sending of the request for said substitutive address to the selected address translator until predetermined conditions are met.

6. The packet-switched communication apparatus according to claim 5, wherein said address obtaining means repeats the sending of the request for said substitutive address to the selected address translator until obtaining the substitutive address of need.

7. The packet-switched communication apparatus according to claim 5, wherein said address obtaining means repeats the sending of the request for said substitutive address to all the address translators mapped to the network-dependent part of said address.

8. The packet-switched communication apparatus according to claim 5, wherein said address obtaining means repeats the sending of said request by a preset number of times.

9. The packet-switched communication apparatus according to claim 1, wherein said first network is an IPv6 network, and wherein the network-depending part of said address is a prefix value of an IPv6 address of a client terminal which is connected to said IPv6 network.

10. The packet-switched communication apparatus according to claim 1, wherein said address replacement is intended to replace an address specified for a query for a name corresponding to the address of a client terminal for communication in accordance with a DNS protocol, wherein, if said address is an IPv4 address, said address obtaining means obtains an IPv6 address as the substitutive address;

if said address is an IPv6 address, said address obtaining means obtains an IPv4 address as the substitutive address.

11. The packet-switched communication apparatus according to claim 10, wherein, upon receiving a name resolution request packet for a name corresponding to an IPv4 address, query data included in the received name resolution request packet is replaced by the obtained substitutive address and a name resolution request packet with the replaced query data is transmitted to a DNS server, when a source IPv6 address of the received name resolution request packet is mapped to an ID of the name resolution request packet to transmit, wherein said packet-switched communication apparatus further comprises packet ID retaining means for retaining a mapping between said source IPv6 address and said ID of the request packet, and wherein, upon receiving a reply packet for notification of the name corresponding to the IPv6 address, said address obtaining means selects one of said address translators, based on the IPv6 address mapped to the ID of the reply packet, and sends a request for a substitutive IPv4 address to the selected address translator.

12. The packet-switched communication apparatus according to claim 10, wherein, upon receiving a name resolution request packet for a name corresponding to an IPv6 address, said address obtaining means selects one of said address translators, based on the IPv6 address corresponding to a string to be resolved to a name by the request included in the packet, and sends a request for a substitutive IPv4 address to the selected address translator.

13. The packet-switched communication apparatus according to claim 12, wherein, upon receiving a reply packet for notification of the name corresponding to the IPv4 address, said address obtaining means selects one of said address translators, based on the source IPv6 address of the packet, and sends a request for a substitutive IPv6 address to the selected address translator.

14. The packet-switched communication apparatus according to claim 1, wherein, after said address obtaining means obtains said substitutive address, the address or a string including the address included in the received packet is replaced by said substitutive address or a string including the substitutive address and the packet is forwarded to a predetermined destination.

15. The packet-switched communication apparatus according to claim 1, wherein, if said address obtaining means fails to obtain said substitutive address, the received packet is forwarded as is to the predetermined destination.

16. The packet-switched communication apparatus according to claim 1, wherein said address translator selecting means select one of said address translators, based on a source address of the received packet, and wherein said address obtaining means sends a request for a substitutive address to the selected address translator.

17. A communication method for forwarding packets pertaining to communication setup between two client terminals, one terminal being attached to a first network and the other terminal being attached to a second network, wherein said first network which uses IPv6 and said second network which uses IPv4 are connected via an address translator, said communication method to be applied in a packet-switched communication apparatus which is connected to said IPv6 network and retains mappings between IPv6 address prefixes and address translators, each being responsible for a specific range of the prefixes, comprising:

receiving a name resolution request packet on behalf of a DNS server;

upon receiving said name resolution request packet, selecting one of said address translators, based on an address included in the name resolution request packet, referring to said mappings retained on the packet-switched communication apparatus;

obtaining a substitutive address from the selected address translator;

by using the obtained substitutive address, replacing a name query string generated from the specified address included in said name resolution request packet by a name query string generated from said substitutive address; and forwarding the name resolution request packet.

18. The communication method according to claim 17, further comprising:

receiving a name resolution request packet for a name corresponding to an IPv4 address;

replacing query data included in the received name resolution request packet by the obtained substitutive address;

transmitting a name resolution request packet with the replaced query data to a DNS server;

mapping a source IPv6 address of the received name resolution request to an ID of the name resolution request packet to transmit;

retaining a mapping between said source IPv6 address and said ID of the request packet;

receiving a reply packet for notification of the name corresponding to the IPv6 address;

selecting one of said address translators, based on the IPv6 address mapped to the ID of the reply packet; and sending a request for a substitutive IPv4 address to the selected address translator.

19. The communication method according to claim 18, further comprising:

receiving a name resolution request packet for a name corresponding to an IPv6 address;

selecting one of said address translators, based on the IPv6 address corresponding to a string to be resolved to a name by the request included in the packet; and sending a request for a substitutive IPv4 address to the selected address translator.

20. The communication method according to claim 19, further comprising:

receiving a reply packet for notification of the name corresponding to the IPv4 address;

selecting one of said address translators, based on the source IPv6 address of the packet; and sending a request for a substitutive IPv6 address to the selected address translator.

* * * * *